(12) United States Patent
Li et al.

(10) Patent No.: US 9,710,536 B2
(45) Date of Patent: **\*Jul. 18, 2017**

(54) METHOD AND SYSTEM FOR VALIDATING DATA

(75) Inventors: Xue C. Li, Beijing (CN); Xiao J. Fu, Beijing (CN); Xue F. Gao, Beijing (CN); Xin Xin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1075 days.

This patent is subject to a terminal disclaimer.

(21) Appl. No.: 13/465,329

(22) Filed: May 7, 2012

(65) Prior Publication Data

US 2012/0221510 A1  Aug. 30, 2012

Related U.S. Application Data

(63) Continuation of application No. 13/032,681, filed on Feb. 23, 2011, now Pat. No. 8,219,520.

(30) Foreign Application Priority Data

Mar. 31, 2010  (CN) .................... 2010 1 0138994.5

(51) Int. Cl.
    *G06F 7/00*    (2006.01)
    *G06F 17/00*   (2006.01)
    *G06F 17/30*   (2006.01)

(52) U.S. Cl.
    CPC .. *G06F 17/30592* (2013.01); *G06F 17/30563* (2013.01)

(58) Field of Classification Search
    None
    See application file for complete search history.

(56) References Cited

U.S. PATENT DOCUMENTS

| | | | |
|---|---|---|---|
| 6,829,621 B2 | 12/2004 | Keller | |
| 7,401,321 B2 * | 7/2008 | Sit et al. | 717/125 |
| 7,418,438 B2 | 8/2008 | Gould et al. | |
| 7,870,012 B2 * | 1/2011 | Katz et al. | 705/7.26 |

(Continued)

FOREIGN PATENT DOCUMENTS

| | | |
|---|---|---|
| CN | 1564160 | 1/2005 |
| CN | 101136030 | 3/2008 |
| CN | 101477572 | 7/2009 |

OTHER PUBLICATIONS

Ventkataramani, Murali; Visual Data Quality Analysis on OLAP data using Multidimensional Reporting too, URL: http://e=learning. dmst.aueb.gr/mis/Cases/Dell/Case/Training_Files/Data_Quality. pdf, 3 pages.

(Continued)

*Primary Examiner* — Tuan A Pham
(74) *Attorney, Agent, or Firm* — Schmeiser, Olsen & Watts, LLP; John Pivnichny

(57) ABSTRACT

A method and system for validating data. Warehouse data is generated by transforming source data via an ETL transformation model. A data cube is generated by transforming the warehouse data via an OLAP transformation model. A report dataset (MDS1) is generated from the data cube. A reference dataset (S) is generated from the source data. A data validation is performed, the data validation being based on a matching relationship between MDS1 and S.

22 Claims, 9 Drawing Sheets

(56) References Cited

U.S. PATENT DOCUMENTS

| | | | |
|---|---|---|---|
| 7,984,019 B2 | 7/2011 | Boyko et al. | |
| 8,219,520 B2 | 7/2012 | Li et al. | |
| 2002/0116213 A1* | 8/2002 | Kavounis et al. | 705/1 |
| 2007/0022093 A1* | 1/2007 | Wyatt et al. | 707/2 |
| 2007/0185867 A1* | 8/2007 | Maga | G06Q 30/02 |
| 2007/0239769 A1* | 10/2007 | Fazal | G06F 17/30554 |
| 2008/0077656 A1* | 3/2008 | Broda | H04L 67/2842 709/203 |
| 2008/0306987 A1* | 12/2008 | Chen et al. | 707/102 |
| 2008/0307262 A1* | 12/2008 | Carlin, III | G06F 17/30303 714/37 |
| 2008/0307386 A1* | 12/2008 | Chen et al. | 717/109 |
| 2009/0083306 A1* | 3/2009 | Sichi et al. | 707/102 |
| 2009/0172047 A1* | 7/2009 | Boyko | G06F 17/30563 |
| 2009/0299969 A1* | 12/2009 | Le | 707/3 |
| 2009/0300533 A1* | 12/2009 | Williamson | 715/771 |
| 2010/0076977 A1* | 3/2010 | Wyatt et al. | 707/737 |
| 2010/0211539 A1* | 8/2010 | Ho | G06F 17/30893 707/602 |
| 2010/0250485 A1* | 9/2010 | Dodds | G06F 17/30592 707/602 |
| 2010/0325054 A1* | 12/2010 | Currie et al. | 705/301 |
| 2011/0246415 A1 | 10/2011 | Li et al. | |

OTHER PUBLICATIONS

Notice of Allowance (Mail Data Feb. 23, 2012) for U.S. Appl. No. 13/032,681, filed Feb. 23, 2011.
SIPO Office Action (Mail Date Aug. 5, 2013); 4 pages.

\* cited by examiner

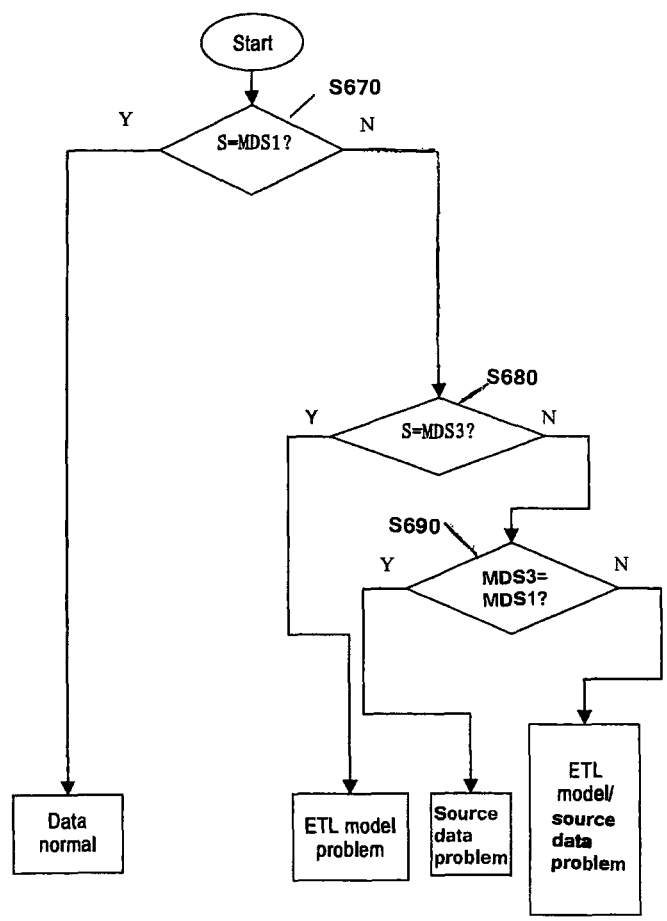
*FIG.* 6B

METHOD AND SYSTEM FOR VALIDATING DATA

This application is a continuation application claiming priority to Ser. No. 13/032,681, filed Feb. 23, 2011, now U.S. Pat. No. 8,219,520, issued Jul. 10, 2012.

FIELD OF THE INVENTION

The present invention relates to data processing technology, and in particular, to a method and a system for validating data.

BACKGROUND OF THE INVENTION

With the development of information technology, more and more people begin to use relevant technology on business intelligence to analyze and process business data to provide powerful support for decision-makers. Also, with the development and application of database technology, the data amount stored in a database rocketed high from mega (M) bytes and gigabytes (G) in the 1980s to current trillion (T) bytes and peta (P) bytes. Meanwhile, query requirements from users also become increasingly complex, which involves not only querying or manipulating one or more pieces of records in a relational table but also performing data analysis and information syntheses on tens of millions of pieces of recorded data in a plurality of tables. However, a transaction processing type relational database system cannot meet all such requirements. For operation and analytical type applications, they cannot meet performance requirements; thus, people always release the restriction on redundancy in a relational database and introduces statistical and integrated data. However, the application logics of such statistical and integrated data are dispersed, random, and unsystematic; thus, the analytical function is limited, inflexible, and difficult to maintain. Many software manufacturers compensate insufficient support from the relational database management system by developing its front end products, attempting to unify dispersed public application logics through a dedicated data integration engine, aided by a more intuitive data access interface, so as to respond to a complex query requirement from a non-professional data processing person in short time.

Business Intelligence (BI) technology processes a great amount of data and reflects information and knowledge in data. Business Intelligence refers to relevant technology, application, etc., which extracts valuable data from existing data of an enterprise so as to help the enterprise to make sensible business operation decisions. The data comprises various kinds of data from the business system of the enterprise itself and other external environments where the enterprise is located. In order to transform data into knowledge, data in a data source is usually populated into a data warehouse through an ETL (Extract-Transform-Load, i.e., a process of data extraction, transformation and loading) model. Then, a data cube is created based on the data in a data warehouse through an OLAP (On-Line Analysis Processing) model, for utilizing data mining to form a statement report and data analysis report.

However, since there are varieties of data sources and processing of ETL model and OLAP model involves a great mount of data, error likely occurs during the BI data processing process. The prior art determines data accuracy by checking the data in the generated report and directly comparing it with the original data in the application system. However, since the data amount in the report is too high, a comprehensible comparison is usually impossible. Besides, even if it is found that the data in the report is inconsistent with the original data in the application system, it is impossible to determine the cause of the problem. The workload for comprehensively checking data in the models and data warehouse is overwhelmingly large, which always needs considerable time to determine the cause of the problem.

SUMMARY OF THE INVENTION

The present invention provides a method (and associated system and computer program product) for validating data, said method comprising:

a processor of a data processing system generating warehouse data in a data warehouse by transforming source data in a data source into the warehouse data via an Extract-Transform-Load (ETL) transformation model;

said processor generating a data cube by transforming the warehouse data in the data warehouse into the data cube via an On-Line Analysis Processing (OLAP) transformation model;

said processor generating a report multi-dimensional data set (MDS1) from the data cube via a data cube query of the data cube;

said processor generating a reference multi-dimensional data set (S) from the source data via a source data query of the source data, said source data query corresponding to the data cube query; and said processor determining whether MDS1 matches S;

wherein if said determining whether MDS1 matches S comprises determining that MDS1 does not match S, then the method further comprises said processor performing an OLAP inverse transformation on MDS1 to generate an OLAP multi-dimensional data set (MDS2) and said processor determining whether MDS2 matches S;

wherein if said determining whether MDS1 matches S comprises determining that MDS1 does not match S and said determining whether MDS2 matches S comprises determining that MDS2 does not match S, then said processor performing an ETF inverse transformation on MDS2 to generate an ETL multi-dimensional data set (MDS3) and said processor determining whether MDS2 matches MDS1 and said processor determining whether MDS3 matches S;

wherein if said determining whether MDS1 matches S comprises determining that MDS1 does not match S and said determining whether MDS2 matches S comprises determining that MDS2 does not match S and said determining whether MDS3 matches S comprises determining that MDS3 does not match S, then said processor determining whether MDS3 matches MDS2.

The present invention provide a method (and associated system and computer program product) for validating data, said method comprising:

a processor of a data processing system generating warehouse data in a data warehouse by transforming source data in a data source into the warehouse data via an Extract-Transform-Load (ETL) transformation model;

said processor generating a report multi-dimensional data set (MDS1) from the data warehouse via a data warehouse query of the data warehouse;

said processor generating a reference multi-dimensional data set (S) from the source data via a source data query of the source data, said source data query corresponding to the data cube query; and said processor determining whether MDS1 matches S;

wherein if said determining whether MDS1 matches S comprises determining that MDS1 does not match S, then the method further comprises said processor performing an ETF inverse transformation on MDS1 to generate an ETL multi-dimensional data set (MDS3) and said processor determining whether MDS3 matches S;

wherein if said determining whether MDS1 matches S comprises determining that MDS1 does not match S and said determining whether MDS3 matches S comprises determining that MDS3 does not match S, then said processor determining whether MDS3 matches MDS1.

By using the method and system according to the embodiments of the present invention, it is possible to validate easily whether data presented to users is problematic, and further determine, if a problem exists in the data, where the problem exists in a Business Intelligence (BI) solution. Therefore, data accuracy is ensured on the one hand, but on the other hand the workload for checking data problems is greatly reduced.

BRIEF DESCRIPTION OF THE DRAWINGS

The above and other objectives, features and advantages of the present invention will become more apparent through more detailed description of embodiments of the present invention as illustrated in the drawings.

FIG. 6B illustrates a flow chart pertaining to the data validation method of FIG. 6A according to an embodiment of the present invention.

DETAILED DESCRIPTION OF THE INVENTION

Hereinafter, the present invention will be described with reference to the methods and system according to the embodiments of the present invention, wherein each block in the flow charts and/or block diagrams and combination of each block in the flow charts and/or block diagrams of the present invention may be implemented with computer program instructions. These computer program instructions may be provided to a processor of a computer or other programmable data processing apparatus such that these instructions executed through the computer or other programmable data processing apparatus implement functions/operations specified in the blocks of the flow charts and/or block diagrams presented herein.

These computer program instructions may also be stored in a computer-readable hardware storage medium capable of instructing the computer or other programmable data processing apparatus to work in a particular manner, such that the instructions stored in the computer-readable hardware storage medium generate a product including instructions configured to be executed by a computer (via a processor of the computer) to implement the functions/operations specified in the flow charts and/or block diagrams.

The computer program instructions may also be loaded onto a computer or other programmable data processing apparatus, such that a series of operation steps is implemented on the computer or other programmable data processing apparatus, to generate a computer-implemented process, such that execution of the instructions on the computer or other programmable apparatus provides a process of implementing the functions/operations specified in the blocks of the flow charts and/or block diagrams presented herein.

The present invention provides a method and system for validating data. The method and system generate a report multi-dimensional data set from a data cube based on a data cube query condition. A reference multi-dimensional data set is generated from the source data based on a source data query condition corresponding to the data cube query condition; meanwhile, an OLAP inverse transformation may be further performed on the report multi-dimensional data set to generate an OLAP multi-dimensional data set, and an ETL inverse transformation is performed on the OLAP multi-dimensional data set to generate an ETL multi-dimensional data set. Data validation is performed based on the matching relationship between the generated multi-dimensional data sets, so as to determine whether data inconsistency exists. By using the method and system, it is possible to easily validate the existence of a problem in data presented to users, and in case of a data problem, to determine where the problem exists in a Business Intelligence (BI) solution.

Figure 1:
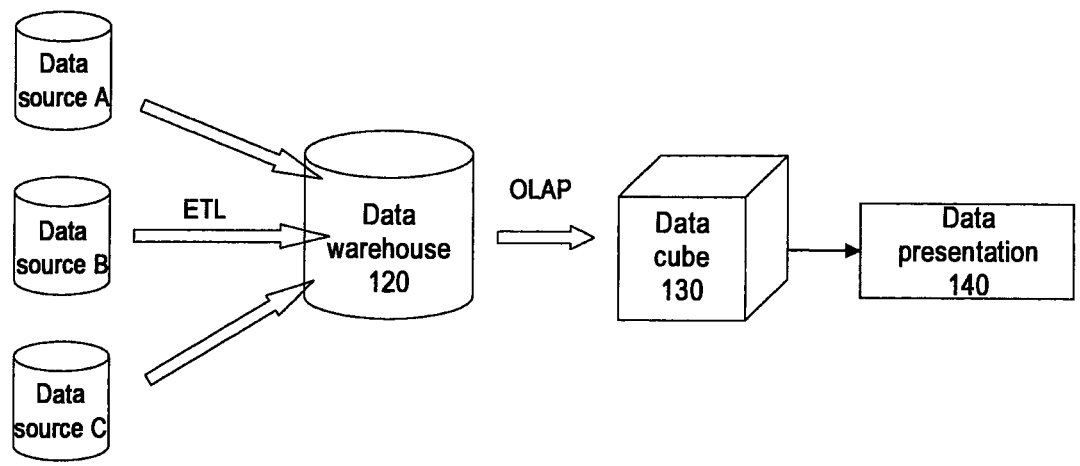
FIG. 1 illustrates a diagram of a typical Business Intelligence (BI) solution architecture.

FIG. 1 illustrates a diagram of a typical BI solution architecture, wherein data in data source A, data source B, and data source C are loaded into a data warehouse 120 through a process of data extraction, transformation and loading based on a predetermined ETL (Extract-Transform-Load) model, and then, a data cube is created based on the data in the data warehouse through an OLAP (On-Line Analysis Processing) model, for utilizing data mining to form a data presentation 140 (statement report and data analysis report, etc).

A data source provides original data or original materials internal or external to a company, and these materials will become a basis for analyzing and extracting knowledge. Data in a data source is generally utilized in an on-line transaction processing (OLTP) system, whose data organization form is generally a transaction-orientated type. That is, data generated for completing a transaction are stored in a centralized manner, and stored in the same table or stored in several closely related tables through a primary-foreign key correlation.

For example, Enterprise Resource Planning (ERP) software is a typical on-line transaction processing system, and the data generated thereby may be used as a data source by a BI solution. Basic information filled by an employee upon enrollment is an independent transaction, and the basic information may be stored in the same table of the data source. The company paying the remuneration to the employee is a transaction, and the remuneration payment condition for each employee may be stored in the same table of the data source. Such a data organization form is called a transaction-oriented type data organization.

A main function of the data warehouse 120 is to organize a large amount of data. By virtue of a data storage architecture of a data warehouse, various kinds of analytical methods such as On-Line Analysis Processing (OLAP) and data mining may be conveniently performed to help a decision maker to figure out valuable information from a considerable amount of data quickly and efficiently. Therefore, it facilitates quick drafting of a decision and quick response to change of an external environment, so as to help construct a BI solution.

Generally, a data warehouse may be established from a relational database, wherein the data warehouse may comprise a plurality of star-shaped structure data organizations each comprising a plurality of dimensional data tables and a fact data table.

A giant enterprise usually has many on-line transaction processing systems (OLTP), i.e., many data resources, and a data warehouse integrates the data from respective OLTP systems of the enterprise and performs consistency processing. A consistency processing process may be included in a data Extract-Transform-Load (ETL) process.

The ETL model is a transformation model for transforming data in a source database into a data warehouse, which defines sources (e.g., locations) of the source data in the data source (for example, a transaction processing-oriented database), a target data location in a target warehouse, and a mapping relationship between the source data and target data. The data Extract-Transform-Load (ETL) process extracts data from the data source with the ETL model, transforms the extracted data into target data, and stores the target data at a target data location in the data warehouse (theme-oriented database).

The ETL model may be described with the following metadata. The data describing and defining the service data per se and its running environment is called metadata. The service data is mainly for supporting data on a service system application, and metadata is data for describing the service data. A typical embodiment of metadata is description of an object, i.e., description of database, table, column, column attributes (type, format, restriction, etc.), primary key/foreign key correlation, etc.

For the ETL processing, the metadata may be used for defining the location and attributes of a data source, the location and attributes of target data; and determining a correspondence rule from the source data to the target data, and other necessary preparatory work before actual loading of the data, etc. It is typically through the whole data warehouse project, and all procedures of ETL processing must refer to the metadata to the utmost, so as to quickly implement the ETL processing.

In the BI solution architecture of FIG. 1, a data cube 130 is further created based on the data in the data warehouse 120 through the On-Line Analysis Processing (OLAP) model.

The data cube is a basis for the On-Line Analysis Processing system in the BI solution, which is generated by transforming the data in the data warehouse through an OLAP model. The data cube may be described through the following definitions:

Dimensions: i.e., an attribute set forms each dimension (e.g., a time attribute set forms a time dimension and a geographic attribute set forms a geographical dimension).

Level of dimension: i.e., a description of the level or unit in which the attribute associated with the dimension is expressed (e.g., levels of the time attribute of a time dimension may be expressed as a date, month, quarter, or year).

Dimension member: i.e., a value of the dimension, which is a description of a location of a data item within a certain dimension. For example, a value of "year, month, day" is a description of a location of a data item within a time dimension.

Measure: i.e., a value at a cell or element of a multi-dimensional data set. For example, the sales volume of laptops in Beijing in March 2008 is 10 sets. Here, "10" sets is the measure or value at the cell or element of the multi-dimensional data set at which March 2008, Beijing, and laptops are dimension members corresponding to the dimensions of time, geographical location, and computer type, respectively.

The OLAP model defines sources (for example, locations) and attributes of source data in the data warehouse, locations of target data in the target data cube, and a mapping relationship between the source data and the target data. With the OLAP model, an OLAP transformation may be performed to the data in the data warehouse to form a data cube comprising a plurality of dimensions and corresponding measures. Accordingly, an OLAP inverse transformation model defines locations and attributes of source data in a data cube, locations of target data in the data warehouse, and a mapping relationship between the source data and the target data.

The OLAP model may be described with metadata to define a location of the data warehouse and attributes of data in the data warehouse, to determine a correspondence rule for storing data from the data warehouse to the data cube and other necessary preparatory work before actual loading of the data, etc.

For example, the metadata of the OLAP model may comprise: from which column in which fact table in the data warehouse the measure data in the data cube comes or from which operation this column of data comes. In the OLAP inverse transformation model, it may correspondingly comprise which column in which fact table in the data warehouse described with metadata coming from which measure data in the data cube, or through inverse operation of which kind of operation this column data being obtained.

Since the data has been integrated (ETL transformation) before the OLAP transformation, information loss will not occur; thus, the OLAP mode usually does not comprise any irreversible transformation.

In the BI solution architecture as illustrated in FIG. 1, with the data in the data cube 130, data may be presented well to the user through data presentation 140, for example, a statement. The data in the cube may be presented to the user through a diagram, for example, a graph such as a histogram, a line graph, or a pie chart, etc, or a column, or an intersection diagram.

The data presented by each statement is only a subset of a data histogram, which is called a target data cube. Partial data in the data cube are extracted based on specific service demands. It is possible to determine from which dimension in the data cube the dimension information of different levels in the statement comes and from which dimension member value of the corresponding dimension in the data cube the dimension member data of different level in the statement come.

Based on a specific service demand and a data organization form of a data cube, a query on the data cube may be generated, which specifically comprises the following items: 1) the data cube from which the data comes, which is dependent on in which data cube the target data to be looked up is stored; 2) the member values for each dimension of the data cube, and the value which should be taken by a respective dimension member in the data cube is determined based on the classification criteria of the data, the filter type of the data, and the definition of the data cube; 3) an operation used to generate the measure presented to the user (i.e., whether it is necessary to define a target data in the business logic by performing a certain operation to the measure of the cube in the business logic, for example, multiplied by a coefficient or a transformation of a unit, etc). A statement generation tool may query data from the data cube through these queries and present it to the user in a form of statement.

In the construction process of such a typical BI solution, frequently occurring problems have the following types: ETL model error, OLAP model error, and dirty data error.

1) ETL Model Error:

The ETL model error mainly refers to logic error occurring in a mapping relationship from a source data to a data warehouse, which causes error occurring to data in the data warehouse and is embodied on the data cube and final statement presentation data. It is necessary to modify the ETL model to correct the error.

2) OLAP Model Error:

The OLAP model error mainly refers to logic error in the mapping relationship from the data warehouse to the data cube, which causes error occurring to data presented in the statement. It is necessary to modify the OLAP model to correct the error.

3) Dirty Data Error:

Dirty data error may be embodied on some illogic data existing in the source data or data warehouse. In a normal environment, these data should not exist. For example, some erroneous or repetitive data are generated in the source data, or some useless data loaded previously are present in the data warehouse, and all of these data may be regarded as dirty data. The validation error caused by dirty data need not be corrected by modifying the solution, which is usually restored by removing the data.

Thus, for a constructed BI solution, on one hand, it is necessary to validate whether the data finally presented to the user is consistent with the original data of the application, and on the other hand, in the case of data inconsistency, it is necessary to figure out the cause of the data consistency. Hereinafter, a data validation method and system according to the embodiment of the present invention will be described in detail.

Figure 2:
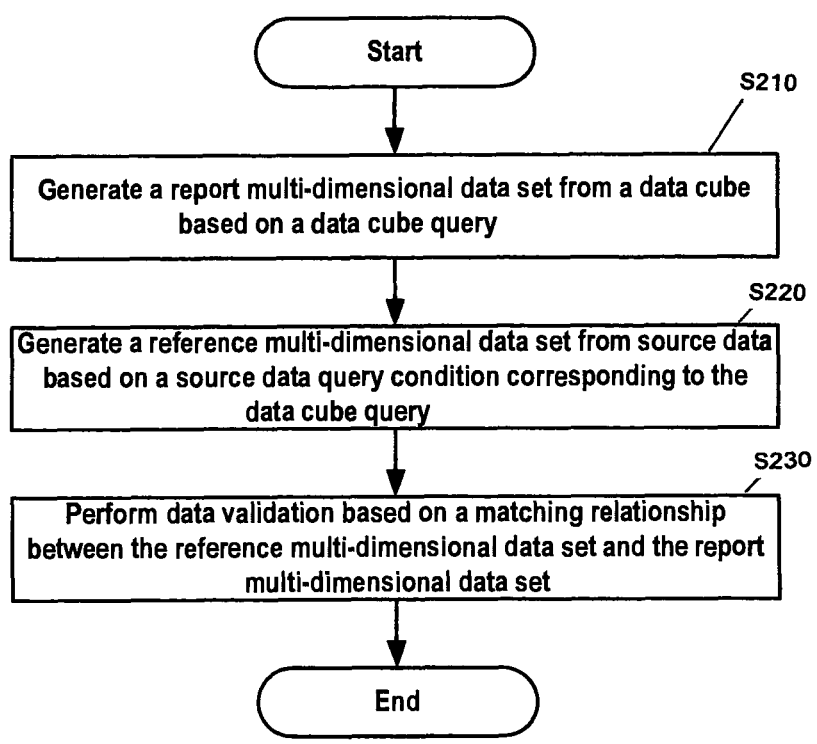
FIG. 2 illustrates a flow chart of a data validation method 200 according to an embodiment of the present invention.

FIG. 2 illustrates a flow chart of a data validation method 200 according to an embodiment of the present invention.

At step S210, a Report Multi-Dimensional Data Set MDS1 is generated from the data cube, wherein the report multi-dimensional data set comprises a measure corresponding to a combination of members of a particular dimension of the data cube. The structure of the multi-dimensional data set may be described as: a dimension comprising the multi-dimensional data set, a type of measure, and a condition to satisfy for data in the data set.

According to an embodiment of the present invention, a report multi-dimensional data set MDS1 is generated from the data cube based on a query of the data cube. Components of the report multi-dimensional data set MDS1 may include: a plurality of dimensions (a dimension of a multi-dimensional data set is determined based on a dimensional definition of a target data cube in the query); each dimension comprises a corresponding member set (the member set of each dimension is determined based on "the member value of a member of each dimension of the data cube" in the query); the measure value corresponding to the member combination of each dimension (based on the set of dimension values, the data is extracted from the data cube for generating a measure value corresponding to the member combination of each dimension).

It should be noted here that for the sake of depiction, the structure of the multi-dimensional data set and the components of the report multi-dimensional data set are described in detail in the embodiments of the present invention. However, the skilled in the art should understand that the structure of the multi-dimensional data set is not limited to the dimension of the multi-dimensional data set, the type of the measure, the condition to satisfy for the data in the data set, etc., and the components of the report multi-dimensional data set is not limited to the above depicted conditions.

At step S220, a reference multi-dimensional data set S is generated from the source data, wherein a source data query corresponding to the data cube query may be generated may be generated based on the specific service requirements and data organization forms of source data; and the reference multi-dimensional data set S is generated from the source data based on the query of the source data.

Generation of the reference multi-dimensional data set S and the report multi-dimensional data set MDS1 comprises extracting data from different data sources based on same specific service demands (for example, what data to look up (e.g., the type of measure), the classification criteria (e.g., dimension), and type of data filter condition satisfied for the data) according to the same specific service requirements; thus, the structures of the reference multi-dimensional data set S and the report multi-dimensional data set MDS1 are identical.

At step S230, data validation is performed based on the matching relationship between the generated multi-dimensional data set and the report multi-dimensional data set. Here, data consistency is determined through matching the generated report multi-dimensional data set MDS1 and reference multi-dimensional data set S.

As previously mentioned, the report multi-dimensional data set and reference multi-dimensional data set may comprise a plurality of dimensions, a dimension member of each dimension, and measure value at the cell or element of the multi-dimensional data set corresponding to a dimension member of each dimension. In this case, the matching relationship between the reference multi-dimensional data set and the report multi-dimensional data set is determined by comparing: a plurality of dimensions in the report multi-dimensional data set and the reference multi-dimensional data set, a dimension member of each dimension in the report multi-dimensional data set and the reference multi-dimensional data set, and the measure value corresponding to the dimension member of each dimension; and then data validation is performed based on the preceding determined matching relationships.

When determining the matching relationship between different multi-dimensional data sets, firstly, the numbers of their dimensions are compared for equality; if they are equal, then the types of their dimension members are further compared for equality; and if they are equal, then the types of the measure values are compared for equality; and if they are equal, then the structures of the multi-dimensional data sets are identical. Otherwise, the structures of the multi-dimensional data sets are different, and it may be necessary to check whether generation of the multi-dimensional data sets is based on the same service requirements.

The reference multi-dimensional data set S is constructed by extracting data from source data based on a query generated based on specific service requirements, and the report multi-dimensional data set MDS1 is also constructed by generating a query into the data cube based on the specific service requirements to thereby extract data. Thus, the reference multi-dimensional data set S and the report multi-dimensional data set MDS1 have same dimensions and measure types, i.e., having a same structure. However, specific dimension member value and measure value come from a data source and a data cube, respectively.

If the reference multi-dimensional data set S matches the report multi-dimension data set MDS1, then it indicates that the data after data processing and the source data are consistent; therefore, there is no data processing problem; otherwise, data processing problem exists.

Figure 3:
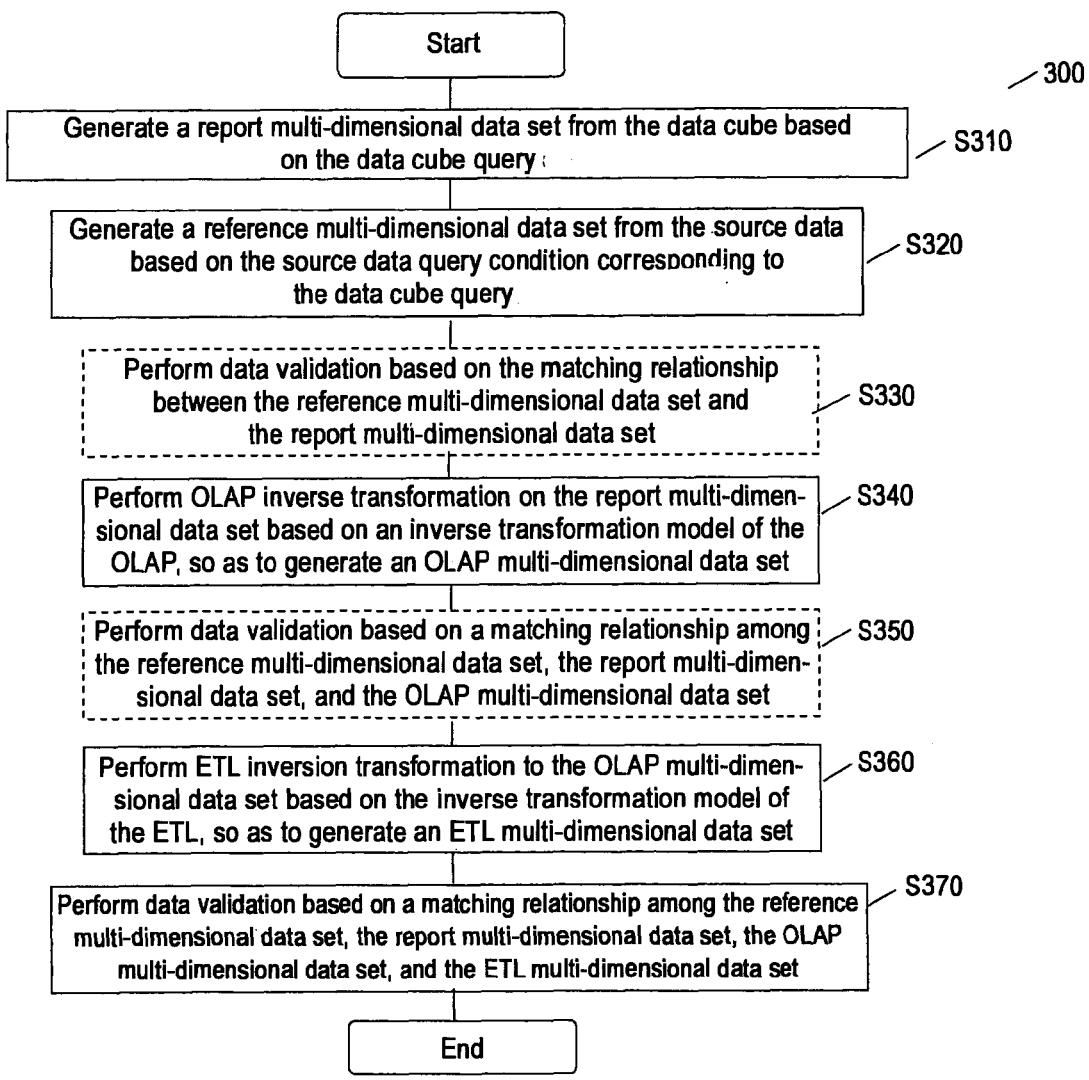
FIG. 3 illustrates a flow chart of a data validation method 300 according to an embodiment of the present invention.

FIG. 3 illustrates a flow chart of a data validation method 300 according to another embodiment of the present invention. The data validation method 300 in the embodiment as illustrated in FIG. 3 has steps S310-330 identical to steps S210-330 in the data validation method 200 in the embodiments as illustrated in FIG. 2. For the sake of simplicity, description will not be repeated.

At step S340, based on the inverse transformation model of the On-Line Analysis Processing OLAP, an OLAP inverse transformation is performed to the report multi-dimensional data set MDS1, so as to generate an OLAP multi-dimensional data set MDS2, wherein an OLAP multi-dimensional data set MDS2 employs a same structure as a report multi-dimensional data set MDS1.

The inverse operation of the model refers to an inverse operation on logic relationship, for example, if a positive-going logic relationship is that the values in column a in Table A of the source data are populated into the column c in the target data table B, then the inverse operation of the logic relationship is that the column c in data Table B is populated into column a in Table A. Since the target data cannot create data itself, there must be a fact in the source data corresponding thereto; thus, there must exist a subset of the source data which has one-to-one mapping relationship with the target data. Thus based on the definition on the OLAP model and the positive-going logic relationship therein, an inverse transformation model of the OLAP model may be obtained, and the inverse transformation model comprises inverse operation of the corresponding positive-going logic relationship.

The OLAP inverse transformation model defines locations and attributes of source data in a data cube, locations of target data in the data warehouse, and a mapping relationship between the source data and the target data. In the OLAP inverse transformation model, it may comprise which column in which fact table in the data warehouse described with metadata coming from which measure data in the data cube, or through the inverse operation of which kind of operation this column data being obtained.

The report multi-dimensional data set MDS1 comprises data from the data cube, including a member set of dimensions and measure values corresponding to member sets of different dimensions. Meanwhile, the process of constructing a report multi-dimensional data set MDS1 may further record the dimensions and measures of the data cube from which the respective data in the report multi-dimensional data set MDS1 come from.

The transformation defined by the OLAP model comprises transformation between dimensions and transformation between corresponding measures, namely, from which column in which fact table in the data warehouse the measure data in the OLAP system come, or from which operation this column of data is obtained, from which dimension tables in the data warehouse the dimensions of different levels in the statement come, and from which columns in which dimension tables in the data warehouse the dimension member data of different levels in the statement come.

The transformations comprised in the above defined OLAP model may be all reversible. Since the data in the target data cube, regardless of dimension data or measure data, come from the fact table or dimension table in the data warehouse, such transformations are reversible. In other words, after obtaining the OLAP model and the structure and data of the data cube, any data in the data cube may be mapped back into the data warehouse. This process is called the inverse transformation process of the OLAP model.

For example, the OLAP inverse transformation model comprises the mapping relationship between the dimensions in the data cube and the dimensional table fields of the data warehouse, the mapping relationship between the measures in the data cube and the fact table fields in the data warehouse, and the mapping relationship of the relationship between the dimensions and measures in the data cube with the relationship between the fact table and the dimension table in the data warehouse.

Based on the dimension member value in the report multi-dimensional data set MDS1 and the mapping relationship between the dimensions of the data cube and the dimension table fields of the data warehouse in the inverse transformation rule of the OLAP model, a set of values of corresponding columns in the dimension table in the data warehouse is obtained, and the set with the values of this column extracted constitutes the member set of the corresponding dimension of the OLAP multi-dimensional data set MDS2.

Next, based on the measure data in the report multi-dimensional data set MDS1 and the mapping relationship between the measures in the data cube and the fact table fields in the data warehouse in the inverse transformation rule of the OLAP model, a set of values of corresponding columns in the fact table of the data warehouse is obtained, and the set with the values of this column extracted constitutes measures of the OLAP multi-dimensional data set MDS2.

After constructing all dimension members and measures of the OLAP multi-dimensional data set MDS2, a mapping relationship between the dimension table of the data warehouse and fact table is obtained, namely the correspondence relationship between the dimension and the measure in the OLAP multi-dimensional data set MDS2, based on the dimensional members and measures in combination with the inversed transformation rule of the OLAP model, In combination with the dimension information, measure information, and the correspondence relationship between the dimension and the measure, the OLAP multi-dimensional data set MDS2 is thereby obtained.

The skilled in the art may understand that what is described above is only an exemplary embodiment of generating the OLAP multi-dimensional data set MDS2, and that other manners may be used to generate an OLAP multi-dimensional data set MDS2 based on the report multi-dimensional data set MDS1 and the inverse transformation model of the On-Line Analysis Processing OLAP.

At step S350, data validation is performed based on the matching relationship between the generated multi-dimensional data sets. Specifically, data validation is performed based on the matching relationship among the reference multi-dimensional data set, the report multi-dimensional data set, and the OLAP multi-dimensional data set, wherein a matching relationship between the reference multi-dimensional data set and the OLAP multi-dimensional data set is determined, and further whether a data processing problem exists is determined based on the matching relationship between the reference multi-dimensional data set and the report multi-dimensional data set, and a matching relationship between the reference multi-dimensional data set and the OLAP multi-dimensional data set. If the reference multi-dimensional data set does not match the report multi-dimensional data set and the reference multi-dimensional data set matches the OLAP multi-dimensional data set, then it is determined that the On-Line Analysis Processing (OLAP) model is problematic. If the reference multi-dimensional data set does not match the report multi-dimensional data set and the reference multi-dimensional data set does not match the OLAP multi-dimensional data set either, then it is necessary to continuously perform the following steps.

At step 360, based on the inverse transformation model of the Extract-Transform-Load ETL, the ETL inverse transformation is performed on the OLAP multi-dimensional data set MDS2, so as to generate an ETL multi-dimensional data set MDS3.

The ETL model may comprise a format adjustment from the source table (in the data source) to the target table (in the data warehouse), for example, integrating a plurality of source database tables into a fact table of the data warehouse, or separating a table of source database table into a plurality of tables in the data warehouse. It is the foremost portion of the ETL model, and the transformation in most ETL models is this kind of transformation. The ETL inverse transformation model may correspondingly comprise a format adjustment described with metadata from the target table (in the data warehouse) to the source table (in the data source).

The ETL model may comprise a transformation of column values in the table, for example, uniformly transforming different kinds of currencies in the source table into dollar, and performing a percentage transformation on the column values, etc. The ETL inverse transformation model may correspondingly comprise an inverse transformation in the column values.

The ETL model may comprise integration of attributes of the columns in the table, for example, combining the values of column A and the values of column B in the source table into a joint of A and B to be stored into column C of the target table. The ETL inverse transformation model may correspondingly comprise splits in the column attributes in the table, for example, splitting the values in column C in the target table into corresponding values of column A and values of column B based on the inverse operation of the above joint.

Additionally, some ETL models may further comprise a consistency processing, for example, unifying all decimal fractions in the data source into 2 digits in the data warehouse. Those exceeding two digits are truncated, and those below two digits are supplemented with 0. This transformation may be classified as an irreversible portion in the model, i.e., a transformation with occurrence of information loss, for example, truncation of decimal digits and truncation of character string length, etc. During generating an inverse transformation in the ETL inverse transformation model, these irreversible transformation operations may be marked. During comparison of multi-dimensional data sets to be described hereinafter, the reference multi-dimensional data set S is compared with other multi-dimensional data sets after the data therein are subjected to an irreversible transformation in the ETL model.

For example, during the process of comparing whether two multi-dimensional data sets (A, B) match, if the dimensional members in the multi-dimensional data set are equal, and meanwhile the measure values corresponding to the dimensional members are also equivalent, then these two multi-dimensional data sets match. If they are not equal, then whether there is an irreversible portion in the reference model is checked. If the multi-dimensional data set B is inversely generated based on the data in the multi-dimensional data set A and the model X, then the corresponding data in A are subjected to the irreversible transformation operation in model X. Afterwards, the processed A is compared with B. If the dimensional members in the multi-dimensional data set are equal and meanwhile the measure values corresponding to the dimension members are also equal, then the two multi-dimensional data sets match. After generation of the reference multi-dimensional data set S, the data therein are firstly subjected to an irreversible transformation in the ETL model and/or OLAP model, and then the reference multi-dimensional data set S is compared with other multi-dimensional data sets. In most cases, the OLAP model does not include the irreversible portion.

The OLAP multi-dimensional data set MDS2 comprises data from the data warehouse, comprising the set of the column values of the fact table and the set of column values of the corresponding dimension tables presented by the measure values corresponding to the member set of dimensions and the member set of different dimensions. Meanwhile, during the process of constructing an OLAP multi-dimensional data set MDS2, it is further possible to record from which column in which fact table and from which column in which dimension table in the data warehouse various data in the MDS2 come.

The inverse transformation of the ETL model comprises a mapping relationship between the fact data in the fact table in the data warehouse and some fields in the source table, and a mapping relationship between the fields in the dimensional table and the fields in the source table in the data warehouse, and the mapping relationship of the correspondence between the fact data and the dimension data of the fact table in the data warehouse with the correspondence between the fields in the source table.

Based on the dimension member value (in fact, the set of column values of the dimension table) and the inverse transformation rule of the ETL model in the OLAP multi-dimensional data set MDS2, processing is performed on the OLAP multi-dimensional data set MDS2 to obtain a set of values of the corresponding column stored in the source data derived from the OLAP multi-dimensional data set. The set of values of this column is extracted to constitute a member set of the corresponding dimension of the ETL multi-dimensional data set MDS3.

After constructing all dimension members of the ETL multi-dimensional data set MDS3, a set of values of corresponding columns of fact table data stored in the source data derived from the OLAP multi-dimensional data set MDS2 is obtained based on the inverse transformation rule of the ETL model. Based on each dimension member constructed in the ETL multi-dimensional data set MDS3, respective dimension members are given (storing values of corresponding columns in the data source of values of related columns in the dimensional table), and based on the mapping relationship of the correspondence between the dimensional data and fact data in the fact table in the data warehouse with the correspondence between the fields in the source table, the values of the corresponding columns storing fact table data in the data source are obtained, i.e., values of the measures in the ETL multi-dimensional data set MDS3.

Based on the dimensional member value (in fact, the set of column values of the corresponding dimension table in the data warehouse) and the inverse transformation rule of the ETL model in the OLAP multi-dimensional data set MDS2, a set of values of the corresponding column stored in the source data corresponding to the corresponding dimensional member values of the OLAP multi-dimensional data set MDS2 is obtained. The set of values of this column is extracted to constitute a member set of the corresponding dimension of the ETL multi-dimensional data set MDS3.

The measure values in the OLAP multi-dimensional data set MDS2 are in fact generated by the set of column values or the column value in the corresponding fact table in the data warehouse through a predetermined operation. After constructing a set of all dimension members of the ETL multi-dimensional data set MDS3, based on the inverse transformation rule of the ETL model, a set of values of corresponding columns of fact table data stored in the source data is obtained (measure values in the OLAP multi-dimensional data set MDS2 corresponding to the corresponding column in the fact table). Based on each dimension member constructed in the ETL multi-dimensional data set MDS3, respective dimension members are given (namely, column values of the table representing this dimension in the source data), and based on the mapping relationship of the correspondence between the fact data and dimensional data in the fact table in the data warehouse with the correspondence between the fields in the source table, the values of the corresponding columns storing data representing measures in the data source are obtained, i.e., values of the measures in the ETL multi-dimensional data set MDS3.

Those skilled in the art may understand, what is described above is only an exemplary embodiment of generating an ETL multi-dimensional data set MDS3, and that other manners may be used to generate an ETL multi-dimensional data set MDS3 based on the ETL inverse transformation model and the OLAP multi-dimensional data set MDS2.

At step S370, data validation is performed based on the matching relationship between the generated multi-dimensional data sets. Specifically, data validation is performed based on the matching relationship among the reference multi-dimensional data set, the report multi-dimensional data set, the OLAP multi-dimensional data set, and the ETL multi-dimensional data set.

For example, the matching relationship between the reference multi-dimensional data set and the ETL multi-dimensional data set and the matching relationship between the report multi-dimensional data set and the OLAP multi-dimensional data set may be determined. Further, where a data processing problem exists is determined based on the matching relationship between the reference multi-dimensional data set and the report multi-dimensional data set, the matching relationship between the reference multi-dimensional data set and the OLAP multi-dimensional data set, the matching relationship between the reference multi-dimensional data set and the ETL multi-dimensional data set, and the matching relationship between the report multi-dimensional data set and the OLAP multi-dimensional data set.

The matching relationship between the OLAP multi-dimensional data set and the ETL multi-dimensional data set may be further determined. In the meanwhile, where a data processing problem exists is determined based on the matching relationship between the reference multi-dimensional data set and report multi-dimensional data set, the matching relationship between the reference multi-dimensional data set and the OLAP multi-dimensional data set, the matching relationship between the reference multi-dimensional data set and the ETL multi-dimensional data set, the matching relationship between the report multi-dimensional data set and the OLAP multi-dimensional data set, and the matching relationship between the OLAP multi-dimensional data set and the ETL multi-dimensional data set.

Hereinafter in FIG. 5, how to validate data based on the matching relationship between a plurality of multi-dimensional data set mentioned above will be depicted in detail to determine whether a data processing problem exists and where it exists.

Here, it should be noted that though in FIG. 3, step S340 is depicted after step S330 and step S360 is depicted after step S350, the skilled in the art may know that in fact, steps S340 and S360 are not necessarily implemented after completion of steps S330 and S350. In fact, according to another embodiment of the present invention, after generating the OLAP multi-dimensional data set and the ETL multi-dimensional data set, data validation is performed further based on the matching relationship between respective multi-dimensional data sets. For example, step S340 and step S360 may be implemented between respective steps as illustrated in FIG. 5, or before respective steps in FIG. 5.

Figure 4:
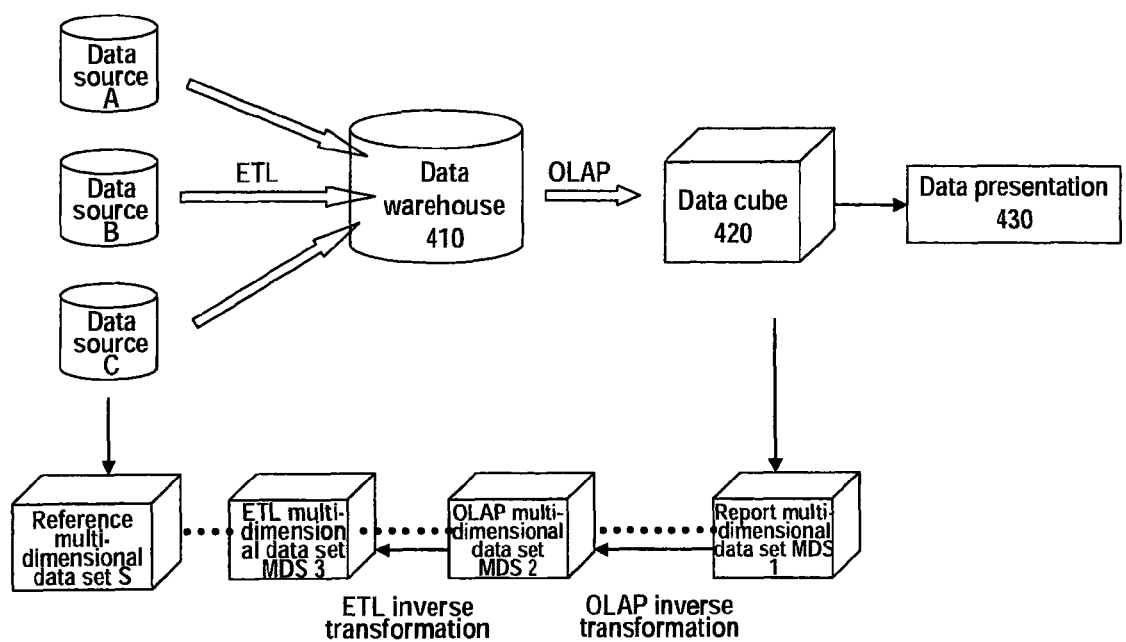
FIG. 4 illustrates a diagram of a data validation method according to an embodiment of the present invention.

FIG. 4 illustrates a plurality of multi-dimensional data sets as generated: reference multi-dimensional data set S, the report multi-dimensional data set MDS1, OLAP multi-dimensional data set MDS2, and ETL multi-dimensional data set MDS3. From FIG. 4, it may be seen that by virtue of the above method, the reference multi-dimensional data set S, the report multi-dimensional data set MDS1, OLAP multi-dimensional data set MDS2, and ETL multi-dimensional data set MDS3 are generated, and through the matching relationships among these multi-dimensional data sets, whether the data processing from the data source 410 to the data warehouse 420 and to the data cube 430 is problematic and where the data processing problem exists in the BI solution are determined.

Hereinafter, comparison between respective multi-dimensional data sets and tracking and positioning a BI solution problem will be depicted in detail with reference to FIG. 5.

As previously mentioned, in the construction process of a BI solution, frequently occurring problems have the following types: ETL model error, OLAP model error, and dirty data error.

Through the comparison results on the report multi-dimensional data set, OLAP multi-dimensional data set, the ETL multi-dimensional data set and the reference multi-dimensional data set, we may determine whether a model design of a BI solution is problematic and where the problem is located.

Figure 5:
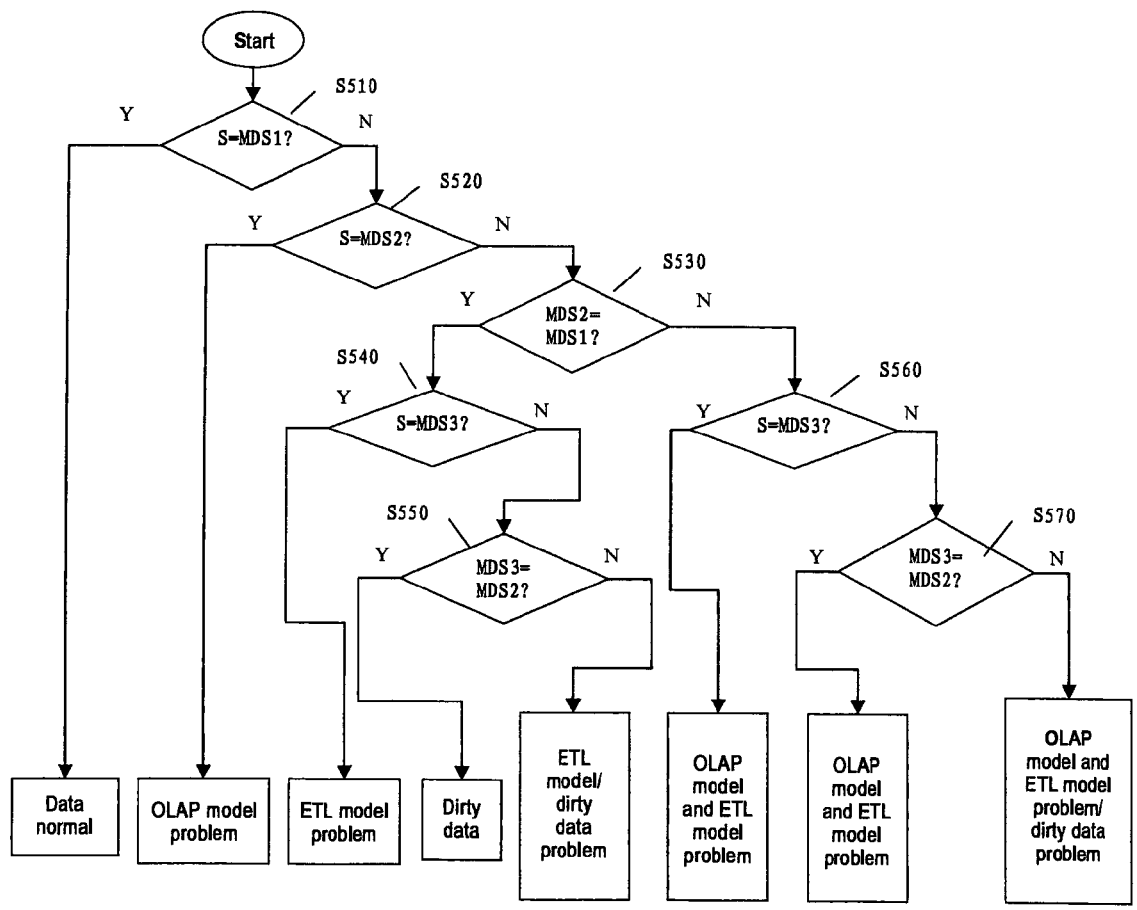
FIG. 5 illustrates a flow chart of pertaining to the data validation method of FIG. 3, according to an embodiment of the present invention.

In FIG. 5, S represents the reference multi-dimensional data set, MDS1 represents the report multi-dimensional data set, MDS2 represents the OLAP multi-dimensional data set, and MDS3 represents the ETL multi-dimensional data set.

At step S510, comparison is performed between the reference multi-dimensional data set and the report multi-dimensional data set; if they match, it is deemed that the presented data has no problem, and no model error and dirty data error are found.

If they do not match, it means a data processing problem exists, then the method proceeds to step S520 to compare the reference multi-dimensional data set and the OLAP multi-dimensional data set; if they match, then it indicates that the OLAP model is problematic.

If they are not equal, then the method proceeds to step S530 to compare the report multi-dimensional data set and the OLAP multi-dimensional data set; if they do not match, then the method proceeds to step S540 to compare the reference multi-dimensional data set with the ETL multi-dimensional data set; and if they match, it indicates that the ETL model is problematic.

At step S540, if the reference multi-dimensional data set and the ETL multi-dimensional data set do not match, then the method proceeds to step S550 to compare the OLAP multi-dimensional data set with the ETL multi-dimensional data set; and if they match, it indicates a dirty data error.

If the OLAP multi-dimensional data set and the ETL multi-dimensional data set do not match at step S550, it indicates that the ETL model is problematic, and meanwhile it is also likely that a dirty data problem exists.

If at step S530, the report multi-dimensional data set and the OLAP multi-dimensional data set do not match, the method proceeds to step S560 to compare the ETL multi-dimensional data set and the reference multi-dimensional data set. If they match, it indicates that both the OLAP model and the ETL model are problematic.

If at step S560, the reference multi-dimensional data set and the reference multi-dimensional data set do not match, then the method proceeds to step S570 to compare the OLAP multi-dimensional data set with the ETL multi-dimensional data set; and if they match, it indicates that the OLAP model and the ETL model are both problematic.

If at step S570, the OLAP multi-dimensional data set and the ETL multi-dimensional data set do not match, it indicates that both the OLAP model and the ETL model are problematic, and meanwhile a dirty data problem likely exists.

Hereinafter, comparison between respective multi-dimensional data sets and tracking and positioning a BI solution problem has been depicted in detail with reference to FIG. 5. Obviously, respective determining steps have been depicted in FIG. 5. The skilled in the art may know that the present invention does not necessarily perform determining according to the flow as illustrated in FIG. 5; the matching relationship between respective multi-dimensional data sets may be determined in an order differing from the order as illustrated in the flow chart of FIG. 5, or tracking and positioning a data processing problem may also be obtained. Moreover, according to another embodiment, tracking and positioning on the data processing problem may also be obtained in a lookup table manner. Table 1 infra clearly introduces solutions to problems confronted in models by BI solutions obtained based on different comparison results. In Table 1, "!=" indicates not equal to.

TABLE 1

| Results of comparing multi-dimensional data sets | Inference of relevant problems |
| --- | --- |
| S=MDS1 | No data problem |
| S!=MDS1 S=MDS2 | OLAP model problem |
| S!=MDS1 S!=MDS2 S=MDS3 MDS1=MDS2 | ETL model problem |
| S!=MDS1 S!=MDS2 S!=MDS3 MDS1=MDS2 MDS2=MDS3 | Dirty data problem |
| S!=MDS1 S!=MDS2 S!=MDS3 MDS1=MDS2 MDS2!=MDS3 | ETL model problem (likely having a dirty data problem) |
| S!=MDS1 S!=MDS2 S=MDS3 MDS1!=MDS2 | ETL model and OLAP model problem |
| S!=MDS1 S!=MDS2 S!=MDS3 MDS1!=MDS2 MDS2=MDS3 | ETL model and OLAP model problem |
| S!=MDS1 S!=MDS2 S!=MDS3 MDS1!=MDS2 MDS2!=MDS3 | ETL model and OLAP model problem (likely having a dirty data problem) |

Figure 6A:
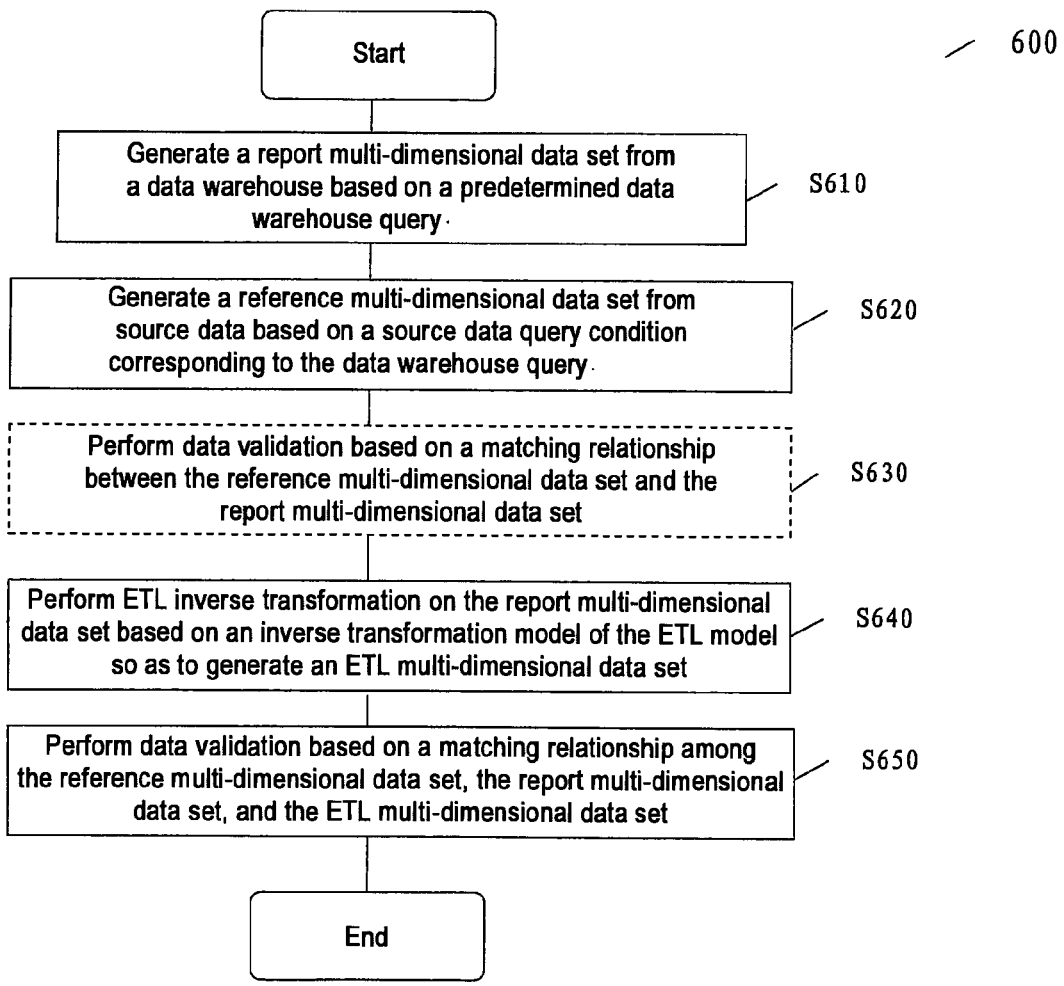
FIG. 6A illustrates a flow chart of a data validation method according to an embodiment of the present invention.

In previous embodiments, the report multi-dimensional data set is generated from the data cube. FIG. 6A illustrates a flow chart of a data processing method according to another embodiment of the present invention. In the method 600 as illustrated, the report multi-dimensional data set is directly generated from the data warehouse. In this case, since the data in the data warehouse are generated from the ETL transformation model but are not subjected to the transformation of the OLAP model; thus, during the process of generating an ETL multi-dimensional data set, it would be unnecessary to further perform an inverse transformation on the OLAP model.

At S610, based on a predetermined data warehouse query, a report multi-dimensional data set (MDS1) is generated from the data warehouse.

At step S620, a reference multi-dimensional data set (S) is generated from the source data based on a source data query condition corresponding to the data warehouse query n.

At step S630, data validation is performed based on the matching relationship between the generated multi-dimensional data sets. Specifically, whether the data are consistent is determined based on the matching relationship between the reference multi-dimensional data (S) set and the report multi-dimensional data set (MDS1), wherein if predetermined items between the reference multi-dimensional data set (S) and the report multi-dimensional data (MDS1) set do not match, then existence of the data processing problem is determined.

As previously mentioned, the report multi-dimensional data set and reference multi-dimensional data set may comprise a plurality of dimensions, a member set of each dimension, and measure value corresponding to a member set of each dimension. In this case, the matching relationship between the reference multi-dimensional data set (s) and the report multi-dimensional data set (MDS1) is determined by comparing a plurality of dimensions in the report multi-dimensional data set (MDS1) and the reference multi-dimensional data set (S), a member set of each dimension, and the measure value corresponding to the member set of each dimension, and then data validation is performed based on the determined matching relationship, respectively.

Likewise, in order to further determine where a data processing problem exists, the method as illustrated in FIG. 6A may further comprise step S640 of performing the ETL inverse transformation on the report multi-dimensional data set (MDS1) based on the inverse transformation model of the ETL model so as to generate an ETL multi-dimensional data set (MDS3).

At step S650, data validation is performed based on the matching relationship between the generated multi-dimensional data sets. Specifically, where a data processing problem exists is determined based on the matching relationship between the reference multi-dimensional data set (S) and the report multi-dimensional data set (MDS1) and the matching relationship between the reference multi-dimensional data set (S) and the ETL multi-dimensional data set (MDS3). If the predetermined items between the reference multi-dimensional data set (S) and the report multi-dimensional data set (MDS1) do not match and the predetermined items between the reference multi-dimensional data set (S) and the ETL multi-dimensional data set (MDS3) match, then it is determined that the ETL model is problematic.

Further, if the predetermined items between the reference multi-dimensional data set (S) and the report multi-dimensional data (MDS1) set do not match and the predetermined items between the reference multi-dimensional data set (S) and the ETL multi-dimensional data set (MDS3) do not match and the predetermined items between the report multi-dimensional data set (MDS1) and the ETL multidimensional data set (MDS3) match, then it is determined that the source data is problematic.

In addition, if the predetermined items between the reference multi-dimensional data set (S) and the report multi-dimensional data (MDS1) set do not match and the predetermined items between the reference multi-dimensional data set (S) and the ETL multi-dimensional data set (MDS3) do not match and the predetermined items between the report multi-dimensional data set (MDS1) and the ETL multi-dimensional data set (MDS3) do not match, then it is determined that the ETL model is problematic and/or the source data is problematic.

Likewise, step S630 here is not necessary, which may, after generating the report multi-dimensional data set (MDS1), reference multi-dimensional data set (S), and the ETL multi-dimensional data set (MDS3), perform data validation based on the matching relationship between respective multi-dimensional data sets to determine whether a data processing problem exists and where it exists.

FIG. 6B illustrates a flow chart pertaining to the data validation method of FIG. 6A, according to an embodiment of the present invention. In FIG. 6B, S represents the reference multi-dimensional data set, MDS1 represents the report multi-dimensional data set, and MDS3 represents the ETL multi-dimensional data set.

At step S670, a comparison is performed between the reference multi-dimensional data set (S) and the report multi-dimensional data set (MDS1). If MDS1 and S match in step S670, it is deemed that the presented data has no problem, and no ETL model error and/or source data error are found. If MDS1 and S do not match in step S670, it means a data processing problem exists, and then the method proceeds to step S680 to compare the reference multi-dimensional data set (S) with the ETL multi-dimensional data set (MDS3).

If MDS3 matches S in step S680, it indicates that the ETL model is problematic. If MDS3 does not match S in step S680, then the method proceeds to step S690 to compare the report multi-dimensional data set (MDS1) with the ETL multi-dimensional data set (MDS3).

If MDS3 matches MDS1 in step S690, it indicates that the source data is problematic. If MDS3 does not match MDS1 in step S690, it indicates that the ETL model is problematic and/or the source data is problematic.

Figure 7:
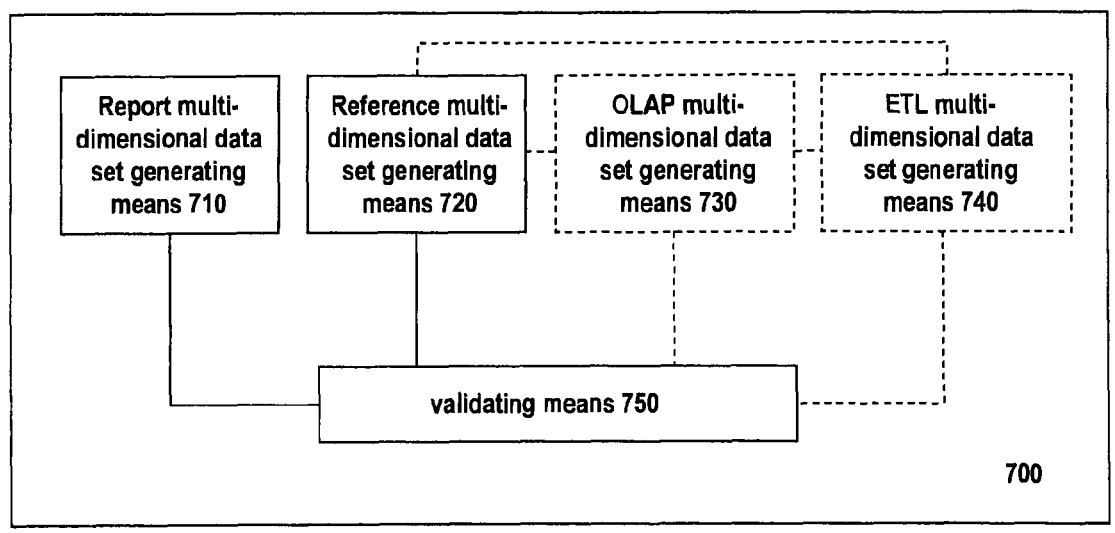
FIG. 7 illustrates a systematic block diagram of a data validation system according to an embodiment of the present invention.

FIG. 7 illustrates a systematic block diagram of a data validation system 700 according to an embodiment of the present invention, wherein the data processing system 700 according to an embodiment of the present invention comprises: report multi-dimensional data set generating means 710 for generating a report multi-dimensional data set from the data cube; reference multi-dimensional data set generating means 720 for generating a reference multi-dimensional data set from the source data corresponding to the data cube; and validating means 750 for performing data validation based on the matching relationship between respective multi-dimensional data sets as generated. The validating means 750 may perform data validation based on the matching relationship between the reference multi-dimensional data set and report multi-dimensional data set, so as to determine whether the data of the data cube is consistent with the source data.

According to an embodiment of the present invention, the report multi-dimensional data set means generates the report multi-dimensional data set from the data cube based on the data cube query, and the reference multi-dimensional data set means, based on the source data query corresponding to the data cube query generates the reference multi-dimensional data set from the source data.

As previously mentioned, the report multi-dimensional data set and reference multi-dimensional data set may comprise a plurality of dimensions, a member set of each dimension, and measure value corresponding to a member set of each dimension. In this case, the validating means may further comprise a comparing means (not illustrated) for determining the matching relationship between the reference multi-dimensional data set and the report multi-dimensional data set by comparing a plurality of dimensions in the report multi-dimensional data set and the reference multi-dimensional data set, a member set of each dimension, and the measure value corresponding to the member set of each dimension, respectively.

According to another embodiment of the present invention, the reference multi-dimensional data set generating means may be further for performing a transformation on the irreversible portion in the ETL model to the data in the reference multi-dimensional data set and taking the transformed reference multi-dimensional data set as the reference multi-dimensional data set as generated.

According to a still further embodiment of the present invention, as illustrated in the dash line portion in FIG. 7, the data processing system 700 may further comprise an OLAP multi-dimensional data set generating means 730, for performing the OLAP inverse transformation on the report multi-dimensional data set based on the inverse transformation model of the OLAP model, so as to generate an OLAP multi-dimensional data set, wherein the validating means performs data validation based on the matching relationship among the reference multi-dimensional data set, report multi-dimensional data set, and an OLAP multi-dimensional data set. For example, the validating means may determine the matching relationship between the reference multi-dimensional data set and the OLAP multi-dimensional data set, and perform data validation based on the matching relationship between the reference multi-dimensional data set and the report multi-dimensional data set and the matching relationship between the reference multi-dimensional data set and the OLAP multi-dimensional data set. If the reference multi-dimensional data set does not match the report multi-dimensional data set and the reference multi-dimensional data set matches the OLAP multi-dimensional data set, then the validating means determines that the OLAP model is problematic.

According to a yet further embodiment of the present invention, as illustrated in the dash line portion in FIG. 7, the data processing system 700 may further comprise an ETL multi-dimensional data set generating means 740, for performing the ETL inverse transformation on the OLAP multi-dimensional data set based on the inverse transformation model of the ETL model, so as to generate an ETL multi-dimensional data set, wherein the validating means performs data validation based on the matching relationship among the reference multi-dimensional data set, report multi-dimensional data set, the OLAP multi-dimensional data set, and the ETL multi-dimensional data set. For example, the validating means may determine the matching relationship between the reference multi-dimensional data set and the ETL multi-dimensional data set and the matching relationship between the report multi-dimensional data set and the OLAP multi-dimensional data set, and based on the matching relationship between the reference multi-dimensional data set and the report multi-dimensional data set, the matching relationship between the reference multi-dimensional data set and the OLAP multi-dimensional data set, the matching relationship between the reference multi-dimensional data set and the ETL multi-dimensional data set, and the matching relationship between the report multi-dimensional data set and the OLAP multi-dimensional data set, so as to determine a data processing problem.

According to another embodiment of the present invention, the validating means determines the matching relationship between the OLAP multi-dimensional data set and the ETL multi-dimensional data set and performs data validation to determine a data processing problem, based on the matching relationship between the reference multi-dimensional data set and the report multi-dimensional data set, the matching relationship between the reference multi-dimensional data set and the OLAP multi-dimensional data set, the matching relationship between the reference multi-dimensional data set and the ETL multi-dimensional data set, the matching relationship between the report multi-dimensional data set and the OLAP multi-dimensional data set, and the matching relationship between the OLAP multi-dimensional data set and the ETL multi-dimensional data set.

According to a yet further embodiment of the present invention, the report multi-dimensional data set generating means 710, based on a predetermined data warehouse query, generates a report multi-dimensional data set from the data warehouse. In this case, it is unnecessary for the data processing system 700 to include an OLAP multi-dimensional data set generating means 730; the ETL multi-dimensional data set generating means 740, based on the inverse transformation model of the ETL model, processes the report multi-dimensional data set so as to generate an ETL multi-dimensional data set, wherein the validating means performs data validation based on the matching relationship among the reference multi-dimensional data set, report multi-dimensional data set, and an ETL multi-dimensional data set. For example, the validating means may determine the matching relationship between the reference multi-dimensional data set and the ETL multi-dimensional data set, and perform data validation based on the matching relationship between the reference multi-dimensional data set and the report multi-dimensional data set and the matching relationship between the reference multi-dimensional data set and the ETL multi-dimensional data set, so as to determine whether a data processing problem exists.

According to a further embodiment of the resent invention, the validating means determines the matching relationship between the report multi-dimensional data set and the ETL multi-dimensional data set and performs data validation to determine a data processing problem, based on the matching relationship between the reference multi-dimensional data set and the report multi-dimensional data set, the matching relationship between the reference multi-dimensional data set and the ETL multi-dimensional data set, and the matching relationship between the report multi-dimensional data set and the ETL multi-dimensional data set.

The present invention further provides a hardware storage medium or device (i.e., hardware storage medium or hardware storage device) in which instructions for executing the methods according to the present invention are stored.

The flow charts and block diagrams in the drawings illustrate an architecture, function and operation likely implemented by the system, methods and a computer program product according to the embodiments of the present invention. In this regard, each block in the flowcharts or block may represent a module, a program segment, or a part of code, which contains one or more executable instructions for performing specified logic functions. It should be noted that in some alternative implementations, functions indicated in blocks may occur in an order differing from the order as illustrated in the figures. For example, two blocks illustrated consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

The skilled in the art would appreciate that the present invention may be embodied as an apparatus, a method, or a computer program product. Thus, the present invention may be specifically implemented in the following manners, namely, complete hardware, complete software (including firmware, resident software, microcode, etc), or a combination of software part and hardware part as generally called "circuit," "module," or "system" in this text. Further, the present invention may adopt a form of computer program product as embodied in any tangible hardware medium or device of expression, the medium or device comprising computer-available program code.

Any combination of one or more computer-readable hardware media or device(s) may be used. The computer-readable hardware medium or device may be for example, but not limited to, electrical, magnetic, optical, electromagnetic, or semiconductor system, means, or device. More specific examples (non-exhaustive list) of the computer-readable hardware medium or device may comprise the following: an electric connection having one or more leads, a portable computer magnetic disk, hard disk, random access memory (RAM), read-only memory (ROM), erasable programmable read-only memory (EPROM or flash disk), optical fiber, portable compact disk read-only memory (CD-ROM), optical storage device, or a magnetic storage device. It should be noted that the computer readable hardware medium may even be a paper or other suitable medium printed with a program thereon, because the program may be obtained electronically by electrically scanning such paper or other medium, and then compiled, interpreted or processed in a suitable manner, and if necessary, stored in a computer memory. In the context of the present document, a computer-readable hardware medium or device may be any hardware medium or device containing, storing a program available for an instruction execution system, apparatus or device, or associated with the instruction execution system, apparatus, or device. A computer-readable available program code may be transmitted by any suitable medium, including, but not limited to, radio, wire, cable, or RF, etc.

A computer program code for executing operation of the present invention may be complied by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example, using an internet service provider via Internet).

Figure 8:
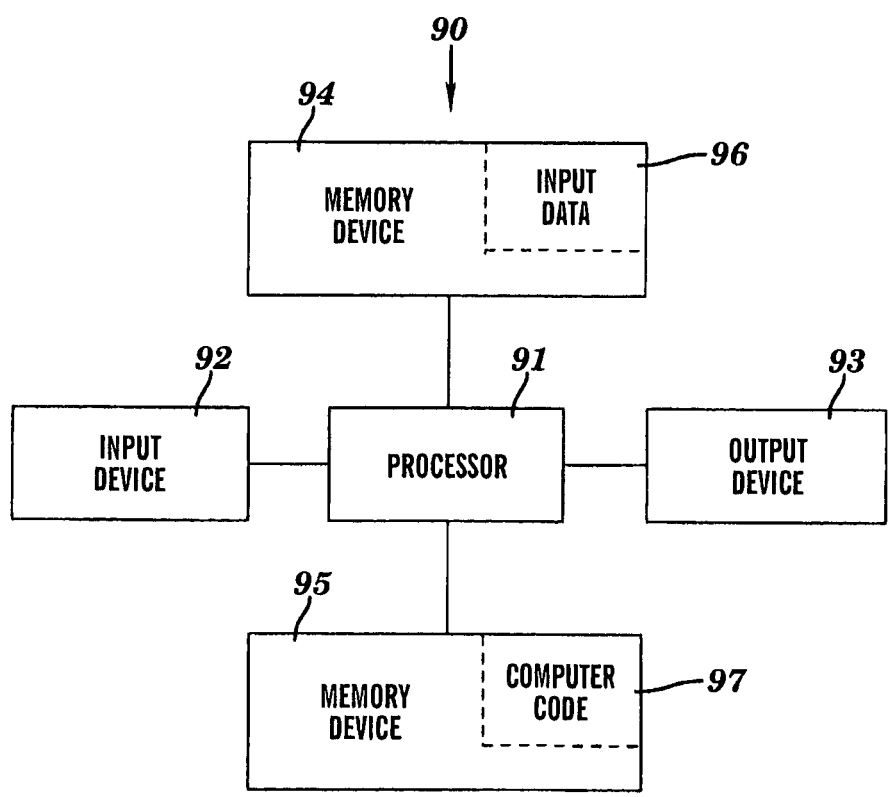
FIG. 8 illustrates a data processing system used for validating data, in accordance with embodiments of the present invention.

FIG. 8 illustrates a data processing system 90 used for validating data, in accordance with embodiments of the present invention. The data processing system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is program code that comprises computer-executable instructions. The computer code 97 includes software or program instructions that may implement an algorithm for validating data. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer readable hardware storage medium (or program storage device) having computer readable program code stored therein and/or having other data stored therein, wherein the computer readable program code comprises the computer code 97. Generally, a computer program product (or, alternatively, an article of manufacture) of the data processing system 90 may comprise said computer readable hardware storage medium or hardware storage device.

While FIG. 8 shows the data processing system 90 as a particular configuration of hardware and software, any configuration of hardware and software, as would be known to a person of ordinary skill in the art, may be utilized for the purposes stated supra in conjunction with the particular data processing system 90 of FIG. 8. For example, the memory devices 94 and 95 may be portions of a single memory device rather than separate memory devices.

The present invention has been described in detail with reference to the preferred solutions, but it would be appreciated that the above embodiments are only for illustrating, not for limiting the present invention. The skilled in the art may modify the solutions as illustrated for the present invention without departing from the scope and spirit of the present invention.

What is claimed is:

1. A method for validating data, said method comprising:
a processor of a data processing system generating warehouse data in a data warehouse by transforming source data in a data source into the warehouse data via an Extract-Transform-Load (ETL) transformation model;
said processor generating a data cube by transforming the warehouse data in the data warehouse into the data cube via an On-Line Analysis Processing (OLAP) transformation model;
said processor generating a report multi-dimensional data set (MDS1) from the data cube via a data cube query of the data cube;
said processor generating a reference multi-dimensional data set (S) from the source data via a source data query of the source data, said source data query corresponding to the data cube query; and
said processor performing a data validation based on a matching relationship between MDS1 and S.

2. The method of claim 1,
wherein said performing the data validation comprises determining whether MDS1 matches S;
wherein if said determining whether MDS1 matches S comprises determining that MDS1 does not match S, then the method further comprises said processor performing an OLAP inverse transformation on MDS1 to generate an OLAP multi-dimensional data set (MDS2) and said processor determining whether MDS2 matches S;
wherein if said determining whether MDS1 matches S comprises determining that MDS1 does not match S and said determining whether MDS2 matches S comprises determining that MDS2 does not match S, then said processor performing an ETF inverse transformation on MDS2 to generate an ETL multi-dimensional data set (MDS3) and said processor determining whether MDS2 matches MDS1 and said processor determining whether MDS3 matches S;
wherein if said determining whether MDS1 matches S comprises determining that MDS1 does not match S and said determining whether MDS2 matches S comprises determining that MDS2 does not match S and said determining whether MDS3 matches S comprises determining that MDS3 does not match S, then said processor determining whether MDS3 matches MDS2.

3. The method of claim 2, wherein said determining whether MDS2 matches S comprises determining that MDS2 matches S.

4. The method of claim 2, wherein said determining whether MDS2 matches S comprises determining that MDS2 does not match S and said determining whether MDS2 matches MDS1 comprises determining that MDS2 matches MDS1 and said determining whether MDS3 matches S comprises determining that MDS3 matches S.

5. The method of claim 2, wherein said determining whether MDS2 matches S comprises determining that MDS2 does not match S and said determining whether MDS2 matches MDS1 comprises determining that MDS2 matches MDS1 and said determining whether MDS3 matches S comprises determining that MDS3 does not match S and said determining whether MDS3 matches MDS2 comprises determining that MDS3 matches MDS2.

6. The method of claim 2, wherein said determining whether MDS2 matches S comprises determining that MDS2 does not match S and said determining whether MDS2 matches MDS1 comprises determining that MDS2 matches MDS1 and said determining whether MDS3 matches S comprises determining that MDS3 does not match S and said determining whether MDS3 matches MDS2 comprises determining that MDS3 does not match MDS2.

7. The method of claim 2, wherein said determining whether MDS2 matches S comprises determining that MDS2 does not match S and said determining whether MDS2 matches MDS1 comprises determining that MDS2 does not match MDS1 and said determining whether MDS3 matches S comprises determining that MDS3 matches S.

8. The method of claim 2, wherein said determining whether MDS2 matches S comprises determining that MDS2 does not match S and said determining whether MDS2 matches MDS1 comprises determining that MDS2 does not match MDS1 and said determining whether MDS3 matches S comprises determining that MDS3 does not match S and said determining whether MDS3 matches MDS2 comprises determining that MDS3 matches MDS2.

9. The method of claim 2, wherein said determining whether MDS2 matches S comprises determining that MDS2 does not match S and said determining whether MDS2 matches MDS1 comprises determining that MDS2 does not match MDS1 and said determining whether MDS3 matches S comprises determining that MDS3 does not match S and said determining whether MDS3 matches MDS2 comprises determining that MDS3 does not match MDS2.

10. The method of claim 1, wherein said transforming the source data into the warehouse data comprises performing an irreversible transformation of the source data into the warehouse data via the ETL transformation model.

11. The method of claim 1, wherein said transforming the warehouse data into the data cube consists of performing a reversible transformation of the warehouse into the data cube via the OLAP transformation model.

12. A data processing system comprising a processor and a computer readable memory unit coupled to the processor, said memory unit containing program code configured to be executed by the processor to implement a method for validating data, said method comprising:
  said processor generating warehouse data in a data warehouse by transforming source data in a data source into the warehouse data via an Extract-Transform-Load (ETL) transformation model;
  said processor generating a data cube by transforming the warehouse data in the data warehouse into the data cube via an On-Line Analysis Processing (OLAP) transformation model;
  said processor generating a report multi-dimensional data set (MDS1) from the data cube via a data cube query of the data cube;
  said processor generating a reference multi-dimensional data set (S) from the source data via a source data query of the source data, said source data query corresponding to the data cube query; and
  said processor performing a data validation based on a matching relationship between MDS1 and S.

13. The data processing system of claim 12,
  wherein said performing the data validation comprises determining whether MDS1 matches S;
  wherein if said determining whether MDS1 matches S comprises determining that MDS1 does not match S, then the method further comprises said processor performing an OLAP inverse transformation on MDS1 to generate an OLAP multi-dimensional data set (MDS2) and said processor determining whether MDS2 matches S;
  wherein if said determining whether MDS1 matches S comprises determining that MDS1 does not match S and said determining whether MDS2 matches S comprises determining that MDS2 does not match S, then said processor performing an ETF inverse transformation on MDS2 to generate an ETL multi-dimensional data set (MDS3) and said processor determining whether MDS2 matches MDS1 and said processor determining whether MDS3 matches S;
  wherein if said determining whether MDS1 matches S comprises determining that MDS1 does not match S and said determining whether MDS2 matches S comprises determining that MDS2 does not match S and said determining whether MDS3 matches S comprises determining that MDS3 does not match S, then said processor determining whether MDS3 matches MDS2.

14. A computer program product, comprising a computer readable hardware storage device having a computer readable program code stored therein, said hardware storage device not being a signal, said computer readable program code configured to be executed by a processor of a data processing system to implement a method for validating data, said method comprising:
  said processor generating warehouse data in a data warehouse by transforming source data in a data source into the warehouse data via an Extract-Transform-Load (ETL) transformation model;
  said processor generating a data cube by transforming the warehouse data in the data warehouse into the data cube via an On-Line Analysis Processing (OLAP) transformation model;
  said processor generating a report multi-dimensional data set (MDS1) from the data cube via a data cube query of the data cube; and
  said processor generating a reference multi-dimensional data set (S) from the source data via a source data query of the source data, said source data query corresponding to the data cube query; and
  said processor performing a data validation based on a matching relationship between MDS1 and S.

15. The computer program product of claim 14,
  wherein said performing the data validation comprises determining whether MDS1 matches S;
  wherein if said determining whether MDS1 matches S comprises determining that MDS1 does not match S, then the method further comprises said processor performing an OLAP inverse transformation on MDS1 to generate an OLAP multi-dimensional data set (MDS2) and said processor determining whether MDS2 matches S;
  wherein if said determining whether MDS1 matches S comprises determining that MDS1 does not match S and said determining whether MDS2 matches S comprises determining that MDS2 does not match S, then said processor performing an ETL inverse transformation on MDS2 to generate an ETL multi-dimensional data set (MDS3) and said processor determining whether MDS2 matches MDS1 and said processor determining whether MDS3 matches S;
  wherein if said determining whether MDS1 matches S comprises determining that MDS1 does not match S and said determining whether MDS2 matches S comprises determining that MDS2 does not match S and said determining whether MDS3 matches S comprises determining that MDS3 does not match S, then said processor determining whether MDS3 matches MDS2.

16. A method for validating data, said method comprising:
  a processor of a data processing system generating warehouse data in a data warehouse by transforming source data in a data source into the warehouse data via an Extract-Transform-Load (ETL) transformation model;
  said processor generating a report multi-dimensional data set (MDS1) from the data warehouse via a data warehouse query of the data warehouse;
  said processor generating a reference multi-dimensional data set (S) from the source data via a source data query of the source data, said source data query corresponding to the data cube query; and
  said processor determining whether MDS1 matches S;
  wherein if said determining whether MDS1 matches S comprises determining that MDS1 does not match S, then the method further comprises said processor performing an ETL inverse transformation on MDS1 to generate an ETL multi-dimensional data set (MDS3) and said processor determining whether MDS3 matches S;

wherein if said determining whether MDS1 matches S comprises determining that MDS1 does not match S and said determining whether MDS3 matches S comprises determining that MDS3 does not match S, then said processor determining whether MDS3 matches MDS1.

17. The method of claim 16, wherein if said determining whether MDS1 matches S comprises determining that MDS1 does not match S, then the method further comprises ascertaining that a data error exists such that said ascertaining ascertains that the data error is an ETL model error in the ETL transformation model and/or a source data error in the source data;

wherein if said determining whether MDS1 matches S comprises determining that MDS1 matches S, then the method further comprises determining that a normal data condition exists such that the ETL transformation model and/or a source data error in the source data does not exist.

18. The method of claim 17, wherein said determining whether MDS1 matches S comprises determining that MDS1 does not match S;

wherein if said determining whether MDS3 matches S comprises determining that MDS3 matches S, then said ascertaining ascertains that the data error is the ETL model error;

wherein if said determining whether MDS3 matches S comprises determining that MDS3 does not match S and said determining whether MDS3 matches MDS1 comprises determining that MDS3 matches MDS1, then said ascertaining ascertains that the data error is the source data error;

wherein if said determining whether MDS3 matches S comprises determining that MDS3 does not match S and said determining whether MDS3 matches MDS1 comprises determining that MDS3 does not matches MDS1, then said ascertaining ascertains that the data error is the ETL model error and/or source data error.

19. The method of claim 16, wherein said determining whether MDS3 matches S comprises determining that MDS3 matches S.

20. The method of claim 16, wherein said determining whether MDS3 matches S comprises determining that MDS3 does not match S and said determining whether MDS3 matches MDS1 comprises determining that MDS3 matches MDS1.

21. The method of claim 16, wherein said determining whether MDS3 matches S comprises determining that MDS3 does not match S and said determining whether MDS3 matches MDS1 comprises determining that MDS3 does not matches MDS1.

22. The method of claim 16, wherein said transforming the source data into the warehouse data comprises performing an irreversible transformation of the source data into the warehouse data via the ETL transformation model.

* * * * *